United States Patent
Paul et al.

(10) Patent No.: US 12,450,595 B1
(45) Date of Patent: Oct. 21, 2025

(54) MIGRATING RESOURCES BETWEEN NETWORKS

(71) Applicant: Citibank, N.A., New York, NY (US)

(72) Inventors: Deepu Paul, Irving, TX (US); Megha Bansal, Irving, TX (US); Surya Kiran Reddy Bujuru, Irving, TX (US); Jayaprakash Lalam, Irving, TX (US); Shuchi Patel, Irving, TX (US); Joyeeta Bhattacharjee, Irving, TX (US); Keerthi Chandra Mallavarapu, Irving, TX (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 18/918,285

(22) Filed: Oct. 17, 2024

(51) Int. Cl.
*G06Q 20/38* (2012.01)
*G06Q 20/02* (2012.01)

(52) U.S. Cl.
CPC ......... *G06Q 20/381* (2013.01); *G06Q 20/027* (2013.01)

(58) Field of Classification Search
None
See application file for complete search history.

(56) References Cited

U.S. PATENT DOCUMENTS

| | | | | |
|---|---|---|---|---|
| 10,693,713 | B1* | 6/2020 | Yang | H04W 24/02 |
| 2007/0272736 | A1* | 11/2007 | Brooks | G06Q 20/28 |
| | | | | 235/379 |
| 2014/0081966 | A1* | 3/2014 | Morris | G06F 16/907 |
| | | | | 707/736 |
| 2014/0188725 | A1* | 7/2014 | Reardon | G06Q 20/40 |
| | | | | 705/44 |
| 2021/0168662 | A1* | 6/2021 | Dowlatkhah | H04W 76/10 |
| 2023/0396596 | A1* | 12/2023 | Hall | H04L 63/0428 |

\* cited by examiner

*Primary Examiner* — Peter D Nolan
*Assistant Examiner* — Matthew Cobb
(74) *Attorney, Agent, or Firm* — Perkins Coie LLP

(57) ABSTRACT

Systems and methods for transferring resources between networks are disclosed herein. The system may receive a request to transfer one or more virtual resources from a first user to a second user, wherein the first user uses a first network, and the second user uses a second network. The system may determine that the one or more virtual resources are of a first resource type of a plurality of resource types, wherein the first resource type is not compatible with the second network and transform the one or more virtual resources from the first resource type into a second resource type that is compatible with the second network. The system may store the one or more virtual resources in the second resource type in an entity repository within the first network and transmit a message onto the second network indicating request completion.

17 Claims, 8 Drawing Sheets

```
user_tag{ user_id:            "123#$8iik76@3"
    username:           "ronald_samson_235
    non_discoverable:   "True"

}
```

400

```
Request {
    request_ID:         8892 first_user_ID:      "123#$8iik76@3"
    first_network_ID:   "network_1"
    resource_ID:        ("resource_1")

second_user_ID:     "p28dbl3k4$@"
    second_network_ID:  "network_A"
}
```

*FIG. 2*

MIGRATING RESOURCES BETWEEN NETWORKS

BACKGROUND

With the number of various types of networks increasing exponentially, network interoperation has become an important area of engineering over time. In particular, different types of networks may host different virtual resources that may be assigned to various users. Transferring or migrating those resources may be a challenge in certain circumstances. Accordingly, network interoperation plays a major role, enabling virtual resource migrations from one network to another.

SUMMARY

Accordingly, systems and methods are described herein for transferring or migrating virtual resources between networks. A resource transfer system may be used for transferring or migrating virtual resources between networks. The resource transfer system may be initiated when a transfer request is received (e.g., from a user). In particular, the resource transfer system may receive, from a user device, a request to transfer one or more virtual resources from a first user to a second user. The first user may use a first network and desire to transfer the virtual resources on the first network to the second user who may use the second network. For example, virtual resources may include different types of data structures or, generally, different data that may be transferred or migrated to a different network. Thus, the first user having a user device with an application for transferring resources to another user on a different network may initiate the transfer by a command from the user device. The resource transfer system may receive the command in a form of a request. In some embodiments, each virtual resource may be a virtual computer system being transferred from a local network to a cloud-based network (e.g., because the local network does not have enough physical resources or is being shut down for maintenance).

Once the request is received, the resource transfer system may analyze the request and determine whether the one or more resources are of a type supported by the target network. Thus, in some embodiments, the resource transfer system may determine that the first user has selected to transfer a first resource type of a plurality of resource types from the first network to the second network such that the first resource type may not be compatible with the second network. To continue with the example above, a virtual machine being migrated from a local network to the cloud may not be compatible with the cloud's environment and may need to be transformed into a proper format that is compatible with the cloud network.

In some embodiments, when the determination is made, the resource transfer system may proceed to remove the one or more virtual resources from the local network. Thus, the resource transfer system may remove the one or more virtual resources from a first user repository within the first network. The first user repository may be one that stores virtual resources of the first resource type. For example, the resource transfer system may take a snapshot of the virtual machine and shut the virtual machine down. In some embodiments, the resource transfer system may wait to shut down the virtual machine until the migration is completed and the migrated virtual machine in the cloud may be turned on at the same time as the location virtual machine is turned off.

The resource transfer system may (e.g., before transferring the virtual machine to the cloud network) transform the one or more virtual resources into a format supported by the target network. In particular, the resource transfer system may transform the one or more virtual resources from the first resource type into a second resource type that is compatible with the second network. For example, the resource transfer system may update virtual machine configurations so that the configurations are compatible with processors, storage, networking, etc. of the physical servers on the cloud network.

When the transform has been completed, the resource transfer system may copy and store the one or more transformed virtual resources on a device on the second network. In particular, the resource transfer system may store the one or more virtual resources in the second resource type in an entity repository within the first network. In some embodiments, the one or more virtual resources may be stored with an identifier corresponding to the request. For example, the resource transfer system may transmit a command to store the virtual machine on the local network in a particular repository associated with the virtual machine.

The resource transfer system may then transmit a message (e.g., onto the second network) indicating that the one or more virtual resources in the second resource type are to be moved from the entity repository to a second user repository corresponding to the second user within the second network. For example, the message may indicate that the virtual machine is to be moved into a production bucket and be turned on.

BRIEF DESCRIPTION OF THE DRAWINGS

FIG. 2 illustrates a data structure that represents an exemplary request, e.g., to transfer resources between networks, in accordance with one or more embodiments of this disclosure.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
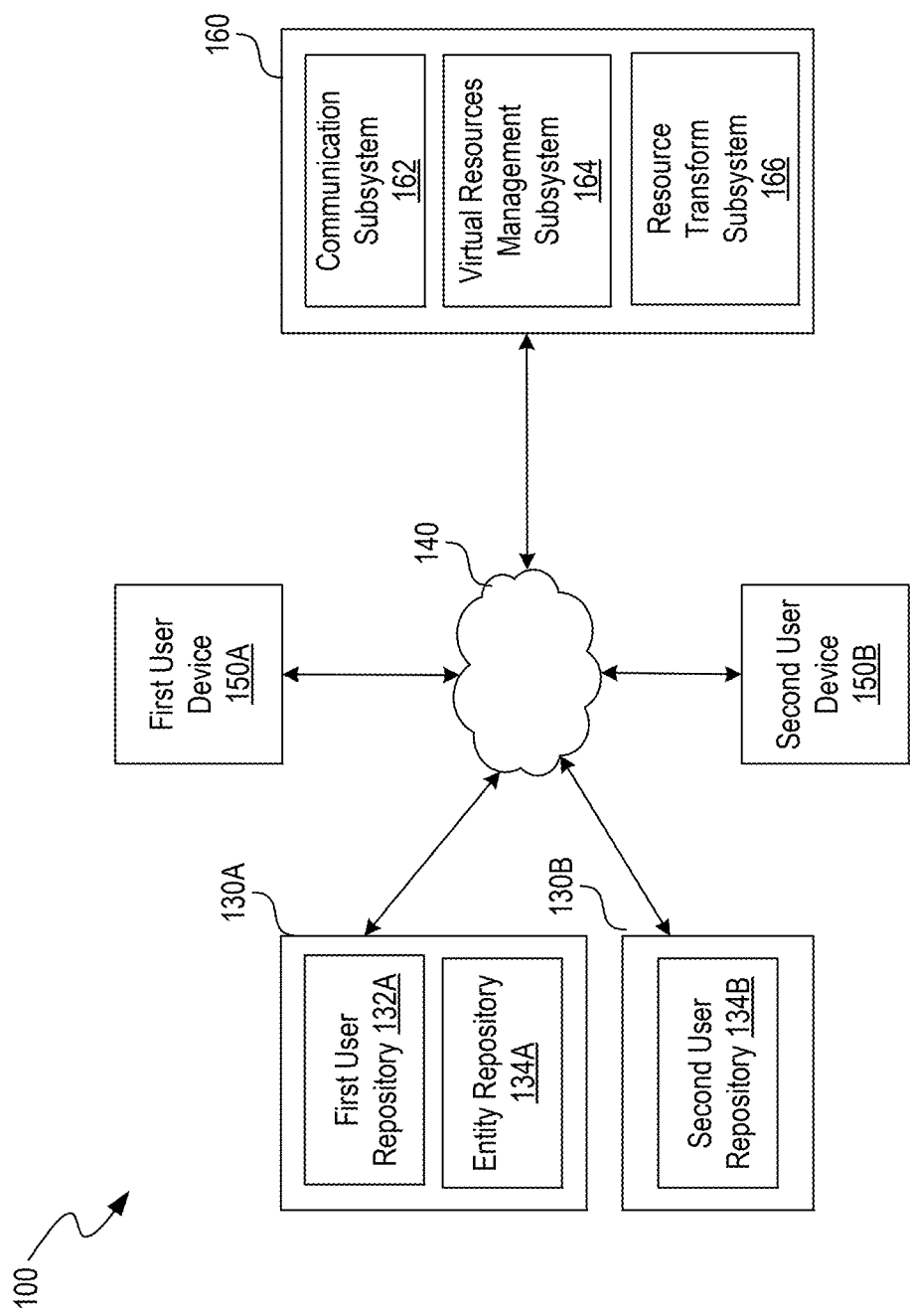
FIG. 1 shows an illustrative system for transferring resources between networks, in accordance with one or more embodiments of this disclosure.

Environment 100 of FIG. 1 shows an illustrative system for transferring resources between networks, in accordance with one or more embodiments of this disclosure. For example, environment 100 may facilitate transfer of a first resource type of a plurality of resource types from a first network to a second network, in particular where the first resource type is not compatible with the second network. In one example, a user may wish to transfer a local virtual machine to a cloud network, e.g., for accessibility or integration with other services. However, a local virtual machine may not be compatible with processors, storage, and networking of physical servers of the cloud network. Environment 100 may help facilitate transfers. For example, environment 100 may include a first user device 150A, through which a first user may request the transfer of virtual resources to a second user device 150B, such as the transfer of a virtual machine from a first computer network 130A (e.g., local network), where virtual resources may initially reside, to a second computer network 130B (e.g., cloud network).

In particular, a virtual resource migration system 160 may execute instructions for transferring the virtual resources, e.g., from the first network to the second network. For example, the virtual resource migration system 160 may receive the request to transfer the virtual resource(s) from a first user (e.g., where the first user uses a first network) to a second user (e.g., where the second user uses a second network), such as where the first resource type is not compatible with the second network. The virtual resource migration system 160 may remove the virtual resource(s) from a first user repository within the first network, where virtual resources of the first resource type are stored. The resources may be transformed from the first resource type into a second resource type that is compatible with the second network and stored in an entity repository within the first network or, in some instances, in the second network.

Virtual resource migration system 160 may include software, hardware, or a combination of the two. For example, virtual resource migration system 160 may be a physical server or a virtual server that is running on a physical computer system. In some embodiments, virtual resource migration system 160 may be configured on a user device (e.g., a laptop computer, a smartphone, a desktop computer, an electronic tablet, or another suitable user device).

A user may transmit a request to transfer one or more virtual resources through a first user device, such as first user device 150A. As referred to herein, a virtual resource may include one or more intangible assets existing within virtualized environments. A virtual resource may be dynamically allocated, configured, or managed by a computing system or network infrastructure. In some examples, virtual resources may include virtual machines, virtual storage units, virtual currencies, such as digital tokens, virtual money, and/or virtual points. In some examples, these resources can be utilized to perform specific tasks or functions.

In some examples, the request may include a request to transfer the virtual resource(s) from a first user, e.g., at first user device 150A, where the first user uses a first network to a second user, e.g., at second user device 150B, where the second user uses a second network. In the example of FIG. 1, a user at first user device 150A may wish to transfer virtual resources using a first computer network 130A to a second user at a second user device 150B using a second computer network 130B. The request may include a request to transfer one or more virtual resources, e.g., of a first type, from a first user for use in providing one or more associated virtual resources, e.g., of a second type, to a second user. As referred to herein, virtual resources of the second type may also be referred to herein as associated virtual resources. The associated virtual resources may be associated or linked with the virtual resources. For example, metadata can be used to link the original (first) virtual resource with its transformed version. The request may be a request to convey one or more virtual resources from a first user as one or more associated virtual resources to a second user, where the first user uses a first network and the second user uses a second network.

According to some examples, the user may be a user attempting to send virtual resources (e.g., currency) to a second user on a different network. For example, the user may have accumulated credit card points, e.g., through usage of a credit card program. The credit card points may be stored on a first network, such as a payment processing network for a credit card company or on a bank network. The user may request to transfer the credit card points to another user on a second network, for example, through a payment network (e.g., Zelle, etc.). The payment network may not support sending resources such as credit card points. For example, the other network may only support virtual resources such as currency, or a digital representation of currency. Since direct transmission of the virtual resource is not possible, e.g., the network of the second user is incompatible with credit card points, the first user may request to transform the points into a format that is compatible with the network of the second user.

Virtual resource migration system 160 may receive the request to transfer using a communication subsystem 162. For example, virtual resource migration system 160 may receive the data from a user at a first user device 150A via a user interface thereon via a communication network 140. Communication network 140 may be a local area network (LAN), a wide area network (WAN; e.g., the internet), or a combination of the two. Communication subsystem 162 may include software components, hardware components, or a combination of both. For example, communication subsystem 162 may include a network card (e.g., a wireless network card and/or a wired network card) that is associated with software to drive the card. Communication subsystem 162 may pass at least a portion of the data, or a pointer to the data in memory, to other subsystems such as a virtual resources management subsystem 164 and a resource transform subsystem 166.

As described herein, the request may be, in some examples, a request to transfer credit card points, e.g., from a credit card account on a first network (e.g., payment network or online banking network) to a dollar value on another network, such as a network associated with a payment application.

For example, FIG. 2 illustrates a data structure that represents an exemplary request, in accordance with one or more embodiments of this disclosure. For example, the data structure may represent a request to transfer one or more virtual resources from a first user who uses a first network to a second user who uses a second network. The data structure 200 may be received by the virtual resource migration system 160 via the communication subsystem 162. Data structure 200 may include one or more fields and parameters such as a field "request_ID" that includes an identifier for the specific request. In the example of FIG. 2, the request identifier is 8892. In some examples, the data structure may not include a request identifier when received by the virtual resource migration system 160 and may instead be attached to the request by the virtual resource migration system 160 upon receiving the request.

The data structure 200 may also include identifiers such as a first user identifier "first_user_ID" and a first network identifier "first_network_ID" from which the virtual resources are being transferred, as well as a second user identifier "second_user_ID", and a second network identifier "second_network_ID" to which the virtual resources are being transferred. Each of the identifiers described herein may include a string of alphanumeric characters, or numeric and alphabetic identifiers. The characters may include a unique string that identifies the network or user at the virtual resource migration system 160 and/or at each of the first and second networks (e.g., first computer network 130A and second computer network 130B).

Data structure 200 may also include identifiers for the one or more virtual resources to be transferred as well. In the example of FIG. 2, the resource identifier(s) "resource_ID" includes a list of virtual resources. In the example of FIG. 2, the resource identifier includes virtual resource "resource_a", however, the resource identifier may identify more than one virtual resource as well.

For example, the data structure 200 may include a request to transform and transfer credit card points of a first user identified by the "first_user_ID" to another user identified by the "second_user_ID" via a second network, such as a payment application (e.g., Zelle, etc.). The first user identifier may include a credit card account number by which the first network, e.g., a credit card company or alternate payment network, can identify the user and user information. The second user identifier may include username or user handle by which the second network may identify the second user. The request may identify virtual resource "resource_1" which may indicate or store a value or amount of credit card points, which are incompatible with cash used by the second network.

Communication subsystem 162 may pass at least a portion of the request data, or a pointer to the data in memory, to virtual resources management subsystem 164. The virtual resources management subsystem 164 may be configured to determine, e.g., based on the request data, that the first user has selected to transfer a first resource type of a plurality of resource types from the first network to the second network, wherein the first resource type is not compatible with the second network. As described herein, incompatibility may refer to the inability of a second network to use or share the virtual resources, e.g., without modification. Some examples of incompatibility may include incompatibility of a virtual resource with processors, storage, networking, etc. of the physical servers on a second network. The system may update or otherwise transform the virtual resource(s) so that the virtual resource(s) are compatible with the second network. In another example, incompatibility may be caused by different formats or different types of resources that are used by the different networks. For example, the first network may use a points system that may be incompatible with a virtual token at the second network, or the second network may use a representation of cash.

According to some examples, incompatibility may include where a first resource type is prohibited from transfer, such as according to various regulations or laws. For example, a first network may be hosted in a first geographical location and the second network may be hosted in a second geographical location different from the first geographical location such as a different country or state. In some examples, the first resource type may be prohibited from being transferred out of the first geographical location and/or to the second geographical location. In particular, the system may determine to transform the virtual resources responsive to identifying relevant laws and regulations for each of the geographical locations and determining that transfer of the first resource type is prohibited.

Virtual resources management subsystem 164 may also be configured to modify the networks to reflect the transfer of the virtual resource(s) between the networks (e.g., the first computer network 130A and second computer network 130B). For example, the virtual resources management subsystem 164 may remove the one or more virtual resources from a first user repository within the first network and add them, once transformed to be compatible, to the second user repository within the second network.

Figure 3A:
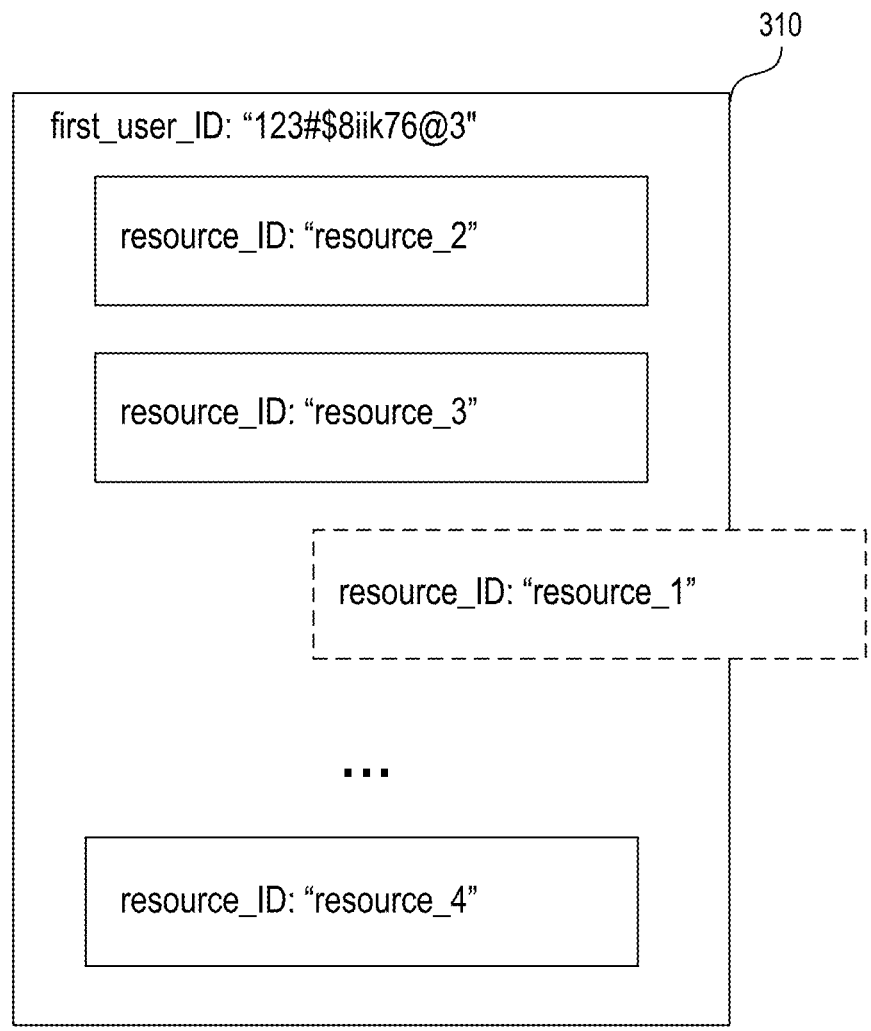
FIG. 3A illustrates an exemplary representation of a user repository storing virtual resources at a first network, in accordance with one or more embodiments of this disclosure.

FIG. 3A illustrates an exemplary representation of a first user repository 310, such as first user repository 132A within the first network. The first user repository 310 may store virtual resources of the first resource type at a first network, in accordance with one or more embodiments of this disclosure. In some embodiments, the first user repository may store the virtual resources of the first resource type assigned to or associated with the first user. Alternatively or additionally, the first user repository may store the virtual resources of the first resource type of groups of users or all users having virtual resources at the first network.

Continuing with the example described above, the first user repository may be a repository corresponding to a user account of a credit card user within a first network, such as a payment or online banking network. The first user repository may include information about the user account and/or may store virtual resources such as credit card points accumulated, e.g., through usage of the credit card. Prior to transforming the credit card points to cash for transfer to another user on a different network, the system may remove the credit card points from the user's credit card account to make them available for transformation and transfer.

As can be seen in the example of FIG. 3A, the virtual resources management subsystem 164 may remove the one or more virtual resources, e.g., credit card points, from a first user repository within the first network, wherein the first user repository stores virtual resources of the first resource type. In the example of FIG. 3A, the first user repository 310 stores virtual resources of the first user (e.g., as indicated by the first user identifier "first_user_ID: '123#$8iik76@3'"). The virtual resources of the first user include "resource_1," "resource_2," "resource_3," and "resource_4".

Following the example of FIG. 2, the request indicates that the resources to be transferred include the resource having identifier "resource_1". The virtual resources management subsystem 164 removes the entry associated with "resource_1" to transfer the resources to the second user via the second network.

According to some examples, the virtual resources management subsystem 164 may cause the removal of the virtual resources by transmitting instructions to remove the resources via the communication subsystem 162 and communication network 140 to the first computer network 130A. The first computer network 130A may then cause removal of the virtual resources and pass information regarding the virtual resource to the virtual resource migration system 160 via the communication subsystem 162 and communication network 140. Alternatively or additionally, the virtual resources management subsystem 164 may have direct access to the first and/or second computer networks (e.g., first computer network 130A and/or second computer network 130B) and may cause the removal of the virtual resources directly.

The information may include the entire virtual resource, data structures, and/or parameters that represent the virtual resource. In the example where the virtual resource is a virtual machine, the information passed may include the virtual machine configuration, virtual disk files, memory state, networking settings, and security and access control lists. In the example where the virtual resource is a quantity of points that a user has, the information may be a data structure with parameters that identify the number of points.

In the example of FIG. 3A, "resource_1" is removed. Virtual resources management subsystem 164 may pass the virtual resources, or a pointer to the virtual resources in memory, to the resource transform subsystem 166. As described herein, the resource transform subsystem 166 may transform the one or more virtual resources from the first resource type into a second resource type that is compatible with the second network. For example, the resource transform subsystem 166 may do so by retrieving one or more transform parameters associated with both the first resource type and the second resource type and storing, within a transfer repository, the one or more transform parameters in combination with the identifier corresponding to the request. The virtual resources management subsystem 164 may transform the one or more virtual resources using the one or more transform parameters.

In the example where the first resource type is points and the second resource type is a digital representation of currency or cash, the transform parameters may include an exchange rate (e.g., 10 points is equivalent to 2 USD). For example, as described herein, credit card points may not be supported as a resource type on a second network. Since direct transmission of the credit card points from a first credit card user to a second user who uses a bank account is not possible, the credit card points may be removed from an account of the first user on the first network and then transformed to a resource type (e.g., currency) supported at the second network so that the second user may receive the virtual resources of the supported type at the second network. For example, by transforming the points to an equivalent cash value calculated using the exchange rate.

Once the resource transform subsystem 166 transforms the one or more virtual resources from the first resource type into a second resource type, the resource transform subsystem 166 may pass the transformed virtual resource(s), or a pointer to the data in memory, to the virtual resources management subsystem 164. The virtual resources management subsystem 164 may then store the virtual resource(s) in the second resource type in an entity repository within the first network.

For example, transforming a resource from a first resource type to a second resource type may include, for example, adjusting configurations or reformatting the resource of the first resource type. In the example where the first resource is a virtual machine running on a local network, and the second resource type is a virtual machine running on a cloud network, the system may perform various steps such as provisioning the virtual machine by converting the virtual machine image into a cloud-compatible format such as by changing the image file format through automated scripts. This may also include adjusting virtual machine settings such as instance type, network settings, storage configuration, and/or the like.

Figure 3B:
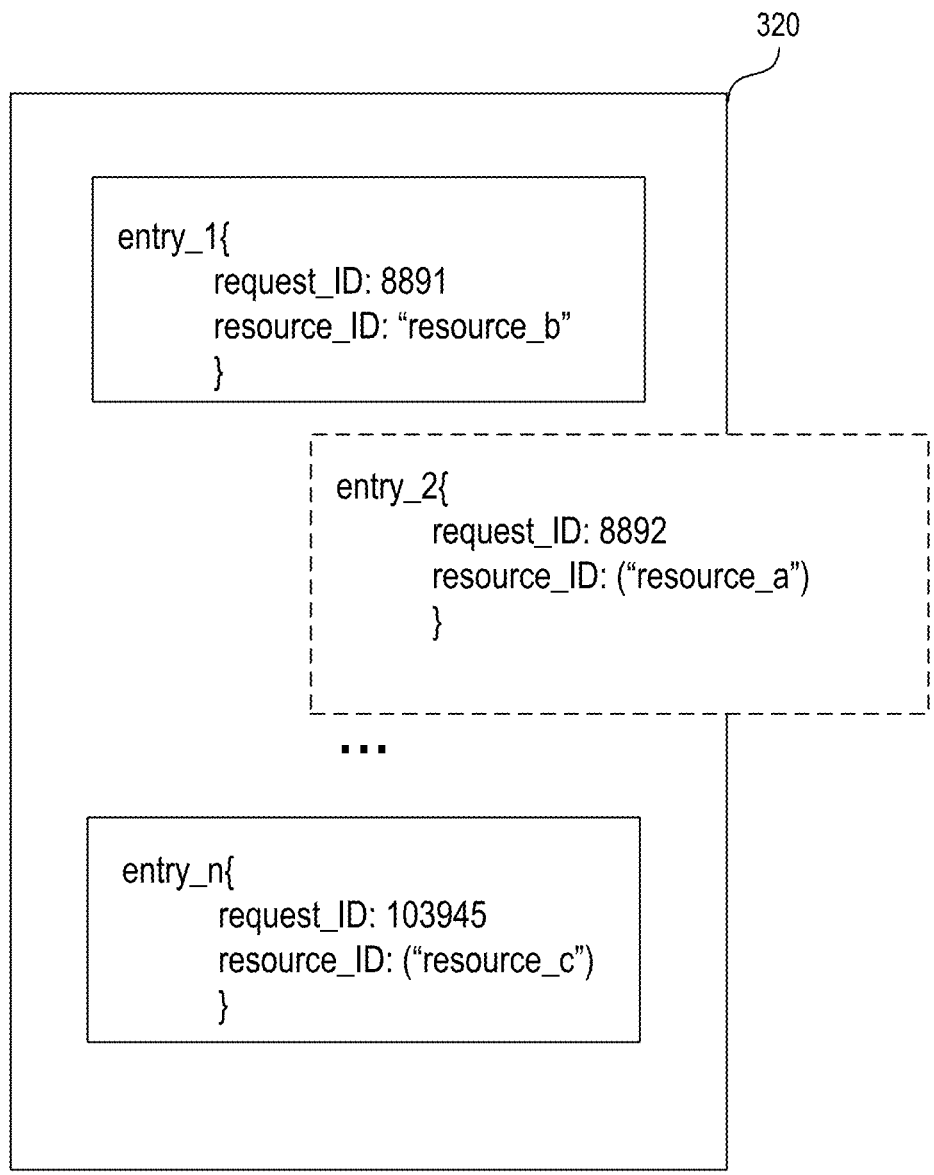
FIG. 3B illustrates an exemplary representation of an entity repository, in accordance with one or more embodiments of this disclosure.

For example, FIG. 3B illustrates an exemplary representation of an entity repository 320, in accordance with one or more embodiments of this disclosure. The entity repository may be part of the first computer network, e.g., such as entity repository 134A of first computer network 130A. The entity repository 320 may store one or more virtual resources with an identifier corresponding to the request on the second network. Although FIG. 3B illustrates the entity repository as being part of the first computer network, the entity repository 320 may be stored at a third-party server or memory.

In the example of FIG. 3B, there are three entries shown corresponding to identifiers corresponding to different requests. For example, the first entry "entry_1" corresponds to a request identifier "8891" and stores a virtual resource having a resource identifier "resource_b". The second entry, "entry_2," corresponds to a request identifier "8892" and stores virtual resources with resource identifiers "resource_a". In the example that the first resource type is points and the second resource type is a digital representation of currency or cash through networks such as online banking and/or payment applications, the resource stored may be a digital representation of currency or cash, and the repository may store the resource as a parameter indicating an amount.

Following the example of FIG. 2, the request indicates that the resources to be transferred include the resource having the identifier "resource_1". After transform of the resources to a second resource type, "resource_a," the virtual resources management subsystem 164 adds the entry (e.g., "entry_2") associated with "resource_a" to the entity repository 320 with the identifier corresponding to the request on the first network.

According to some examples, the virtual resources management subsystem 164 may cause the addition of the virtual resources by transmitting instructions to add the resources via the communication subsystem 162 and communication network 140 to the second computer network 130B. The second computer network 130B may then cause the addition of the virtual resources and pass information regarding the virtual resource to the virtual resource migration system 160 via the communication subsystem 162 and communication network 140. Alternatively or additionally, the virtual resources management subsystem 164 may have direct access to the first and/or second computer networks (e.g., first computer network 130A and/or second computer network 130B) and may cause the addition of the virtual resources directly. As described herein, the transmitted information may include the entire virtual resource, data structures, and/or parameters that represent the virtual resource.

Figure 3C:
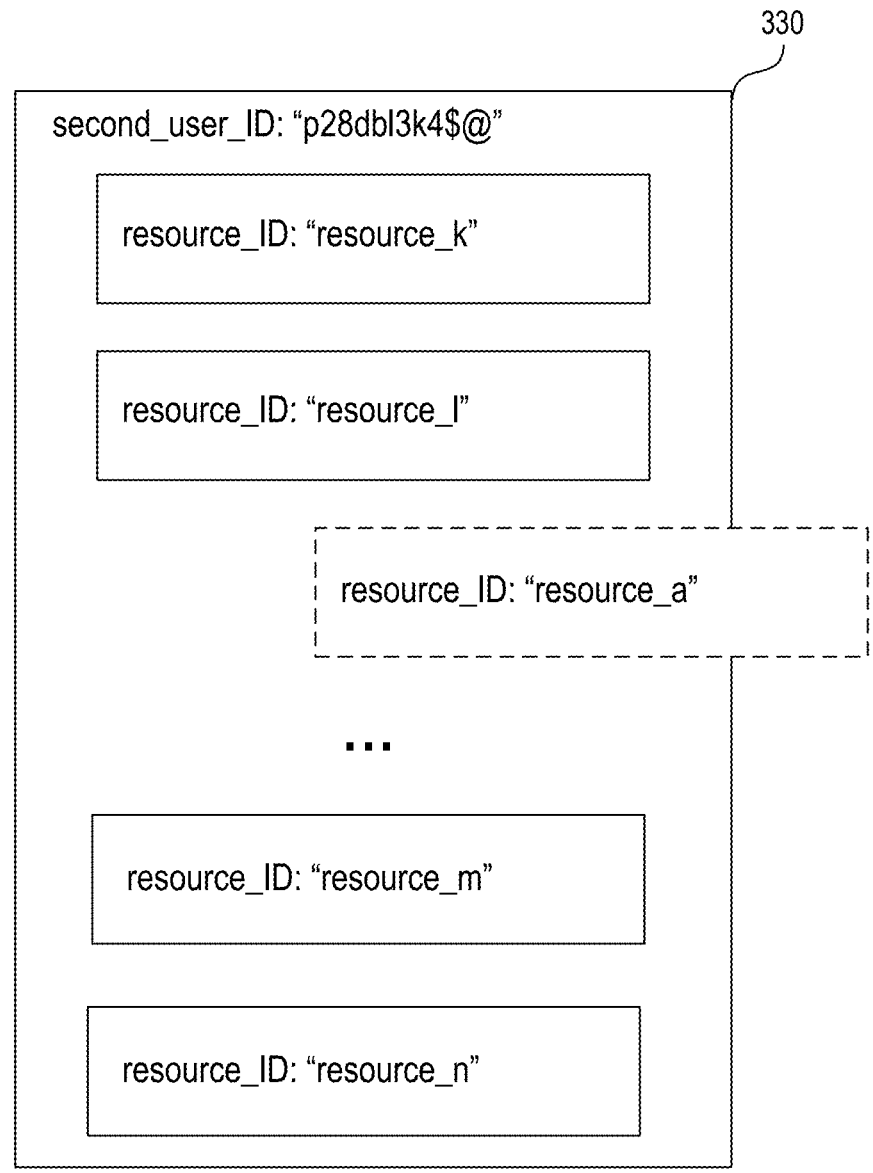
FIG. 3C illustrates an exemplary representation of a user repository storing virtual resources at a second network, in accordance with one or more embodiments of this disclosure.

The virtual resources management subsystem 164 may also transmit a message (e.g., onto or via the second network), using communication subsystem 162, indicating that the one or more virtual resources in the second resource type are to be moved from the entity repository to a second user repository 134B corresponding to the second user within the second network. FIG. 3C illustrates an exemplary representation of a second user repository 330 storing virtual resources at a second network (e.g., second computer network 130B), in accordance with one or more embodiments of this disclosure. In some examples, the transmitted message may indicate to the second network that the virtual machine may be moved into a production bucket and be turned on.

In the example where a user requests to transfer the credit card points from their credit card account on an online banking network to another user as cash on a second network, e.g., payment application, the entity repository may be a repository where all virtual resources to be transferred are held at the first network or the second network. In some examples, it may be a repository that is specific to the first network and holds resources to be transferred from the first network to the second network. For example, once credit card points are removed from a first user's credit card account and subsequently transformed into cash, the cash may be transmitted to the payment application, where the cash can be added to the recipient's bank account. The payment application may then let the second user know that the transformed resources (e.g., the cash) is available for the second user to use.

In the example of FIG. 3C, the second user repository 330 may store virtual resources of the second resource type at a second network, in accordance with one or more embodiments of this disclosure. In some embodiments, the second user repository may store the virtual resources of the second resource type assigned to or associated with the second user. Alternatively or additionally, the second user repository may store the virtual resources of the second resource type of groups of users or all users having virtual resources at the second network.

As can be seen in the example of FIG. 3C, the virtual resources management subsystem 164 may cause the addition of the one or more virtual resources to the second user repository within the second network, wherein the second user repository stores virtual resources of the second resource type. In the example of FIG. 3C, the second user repository 330 stores virtual resources of the second user (e.g., as indicated by the second user identifier "second_user_ID: 'p28db13k4$@'"). The virtual resources of the second user include "resource_k," "resource_l," "resource_a," "resource_m," and "resource_n" where "resource_a" represents the transformed virtual resources from the first network (e.g., "resource_1").

According to some examples, the second user, e.g., at second user device 150B, may reject the virtual resource(s). For example, responsive to determining that no capacity is available for the virtual resource(s), the second computer network or the second device may automatically reject the virtual resource(s). Alternatively or additionally, the second user may manually determine to reject the virtual resource(s) such as through user input or other interactions through the second user device.

The virtual resource migration system 160 may receive, from the second network, a notification indicating that the second user has rejected the one or more virtual resources, e.g., via communication subsystem 162. Based on receiving the notification, virtual resource migration system 160 may retrieve an entry associated with the one or more virtual resources from the entity repository, e.g., entity repository 320. Virtual resources management subsystem 164 may be configured to remove the entry from the entity repository, e.g., such as by transmitting an instruction to the second network via the communication subsystem 162. The virtual resource migration system 160 may then obtain the virtual resources. Resource transform subsystem 166 may be used to transform, using the one or more transform parameters (e.g., exchange rate), the one or more virtual resources from the second resource type into the first resource type. The virtual resources management subsystem 164 may add the one or more virtual resources transformed into the first resource type to the first user repository.

In one example, the second user may receive a notification that cash is available through the second network (e.g., payment application) from the first user. The second user may choose to accept the cash and add the virtual resource to their account (e.g., second user repository), or may choose to reject the cash, in which case the cash may be transformed back as points and given back to the first user.

Figure 4:
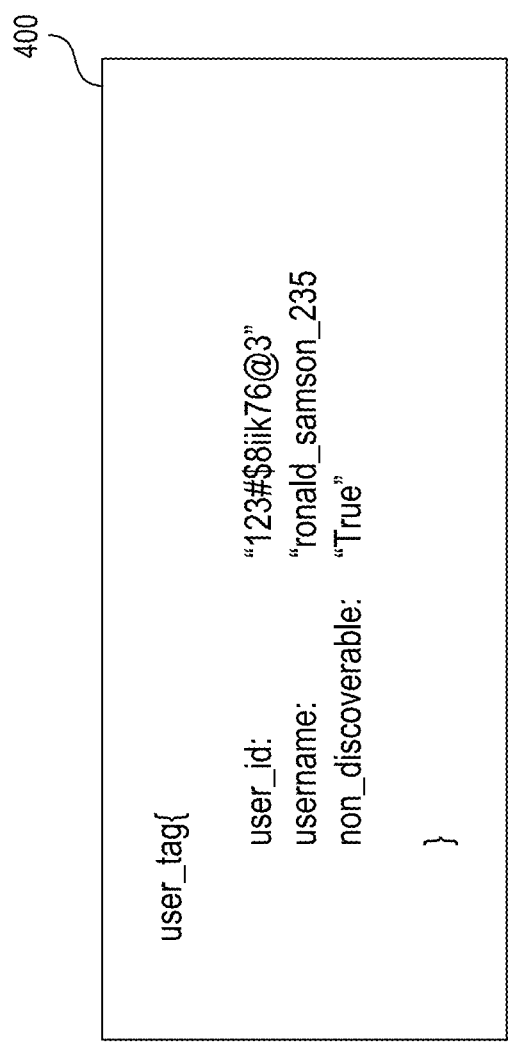
FIG. 4 illustrates an exemplary user tag representing a first user, e.g., who requests transferring of one or more virtual resources, in accordance with one or more embodiments of this disclosure.

According to some embodiments, a network account for the first user may be required at the second computer network in order to enable or otherwise facilitate the transfer of virtual resources. The virtual resource migration system 160 may determine whether the first user is associated with a network account on the second network. For example, the system may determine this through a request to the second network, e.g., an Application Programming Interface (API) call via communication network 140. Based on determining that the first user is not associated with the network account on the second network, the virtual resource migration system 160 may generate, based on user account data on the first network, a user tag representing the first user, wherein the user tag comprises a user identifier associated with the first user. For example, FIG. 4 illustrates an exemplary user tag 400 representing a first user, e.g., who requests transferring of one or more virtual resources, in accordance with one or more embodiments of this disclosure. The user tag may include the user identifier associated with the first user, but may additionally include other information to identify the user.

The virtual resource migration system 160 may retrieve, from a user account on the first network, user parameters associated with the first user. The user parameters may include, for example, a resource type associated with the first user on the first network. They may also include user information such as user email address, password, configurations, name, etc. The system may generate the user tag using the user parameters and an entity identifier associated with an entity corresponding to the entity repository. For example, using the entity identifier may include using the identifier to obtain formatting information specific to the entity stored in memory. Alternatively or additionally, the entity identifier itself may be embedded or inserted into the user tag. In some examples, the entity identifier may be used to make API calls in order to generate a user tag specific to the user using the user parameters, such as username, email address, configurations, etc.

The system may also set a non-discoverable parameter for the user tag to generate a hidden user tag, wherein the hidden user tag disables transfer of the virtual resources to the first user on the first network. For example, the non-discoverable parameter of exemplary user tag 400 is set to "True." Using communication subsystem 162, the system may transmit the hidden user tag from the first network to the second network (e.g., from first computer network 130A to second computer network 130B). A computing device on the second network, such as second user device 150B or a different remote device (e.g., an operator device), may receive the hidden user tag and generate the network account on the second network for the first user. The network account may be enabled to transmit the virtual resources and may not be enabled to receive the virtual resources.

According to some examples, the system may wish to check for existing user tags. For example, the system may retrieve a user account data associated with the first user on the first network and generate a user tag for the first user. In some examples, the user tag creation process may be deterministic and may yield the same user tag given the same user parameters and entity information. The system may, as such, transmit a search request to the second network for an indication of whether the first user is associated with a network account on the second network. The search request may include the user tag. In some examples, the search request may prompt the second computer network to check to see whether the user tag exists in the network.

If the user tag already exists, the system may cease generation of a new user tag or network account of the first user at the second network. Instead, the system may reuse the information from the network account.

Attempting to create a system/process to for transferring or migrating virtual resources between networks in view of the available conventional approaches created significant technological uncertainty. Creating such a system required addressing several unknowns in conventional approaches in transferring or migrating virtual resources between networks, such as security of data transfer, interoperability, authentication and authorization, latency and performance. Previously, conventional approaches included manual entry and manual movement of virtual resources (e.g., by transforming or reconfiguring virtual resources manually). Similarly, conventional approaches for transferring or migrating virtual resources between networks did not enable users to automatically transform networks and associated resources between networks.

Conventional approaches rely on manual reconfiguration and transformation of resources, which techniques described herein do not. For example, a conventional system may require manual intervention to provision resources and fail to ensure seamless transfer of virtual CPUs between cloud environments. Conventional approaches typically involve static resource allocation, pre-defined routing paths, and limited inter-cloud compatibility, which can lead to downtime, manual errors and a lack of dynamic scalability. Conversely, the disclosed system automates the reallocation and dynamic transfer of virtual resources between different cloud environments, ensuring high availability and efficient resource management without requiring manual intervention. Furthermore, by ensuring storage of the transformed resource on a separate repository of one of the two networks, or a trusted third party, the system enables separation of resources from transformed resources, and between claimed resources and unclaimed resources to ensure security.

Additionally, the inherent incompatibility between different cloud environments created further technological uncertainty, since the legacy manual configuration approach often required extensive human involvement to reconfigure virtual machines and processors between different networks, which was slow and prone to misconfigurations. Legacy approaches often resulted in latency, incompatibility issues, and failed transfers. To successfully integrate legacy systems with modern cloud platforms, interoperability, and failover mechanisms must be taken into consideration. For example, while systems described herein enable a situation where a second user rejects the resources at the second network, typical systems only enable one-way transfers, making it impossible for a user at a first network to initiate a resource transfer that a second user may reject in the way described herein.

To overcome the technological uncertainties, the inventors systematically evaluated multiple design alternatives. For example, the inventors experimented with different protocols and data transfer methods and tested various combinations of custodians of resources at each point in time. The inventors also tested various types of methods for preventing certain types of transfers for security reasons, such as non-discoverable parameters to prevent transfers to a user initiating the transfer which allows users to maintain confidentiality or limit them to unwanted exposure, such as by bad actors who may use this information at either the first or second network.

The use of traditional means for securing cross-network transfers proved to be unreliable in maintaining consistent resource performance as it failed to scale effectively when dealing with high-volume data flows associated with virtual CPUs and memory transfers, leading to performance bottlenecks and increased latency. Furthermore, where acceptance of the resource is required by the second network (e.g., a second user on a second network), storing the non-accepted resources at the first network may be more important to minimize security risks. Furthermore, storing the resources on just one of the networks prevents duplicative records and excessive computational resources from being wasted on storage of multiple records. However, traditional means fails to account for such issues. Similarly, relying solely on manual routing protocols did not resolve the issue of dynamic scaling, leading to further inefficiencies in handling fluctuating resource demands.

Thus, the inventors experimented with different methods for automating the movement and scaling of virtual resources between networks, including enabling quick transfer back when a second network rejects the resources. For example, the inventors tested different methods for transforming the resources and different methods to store the transformed and unclaimed resources to identify the most efficient and effective approaches for transfer. Additionally, the inventors systematically evaluated different strategies for securing migration between networks.

Figure 5:
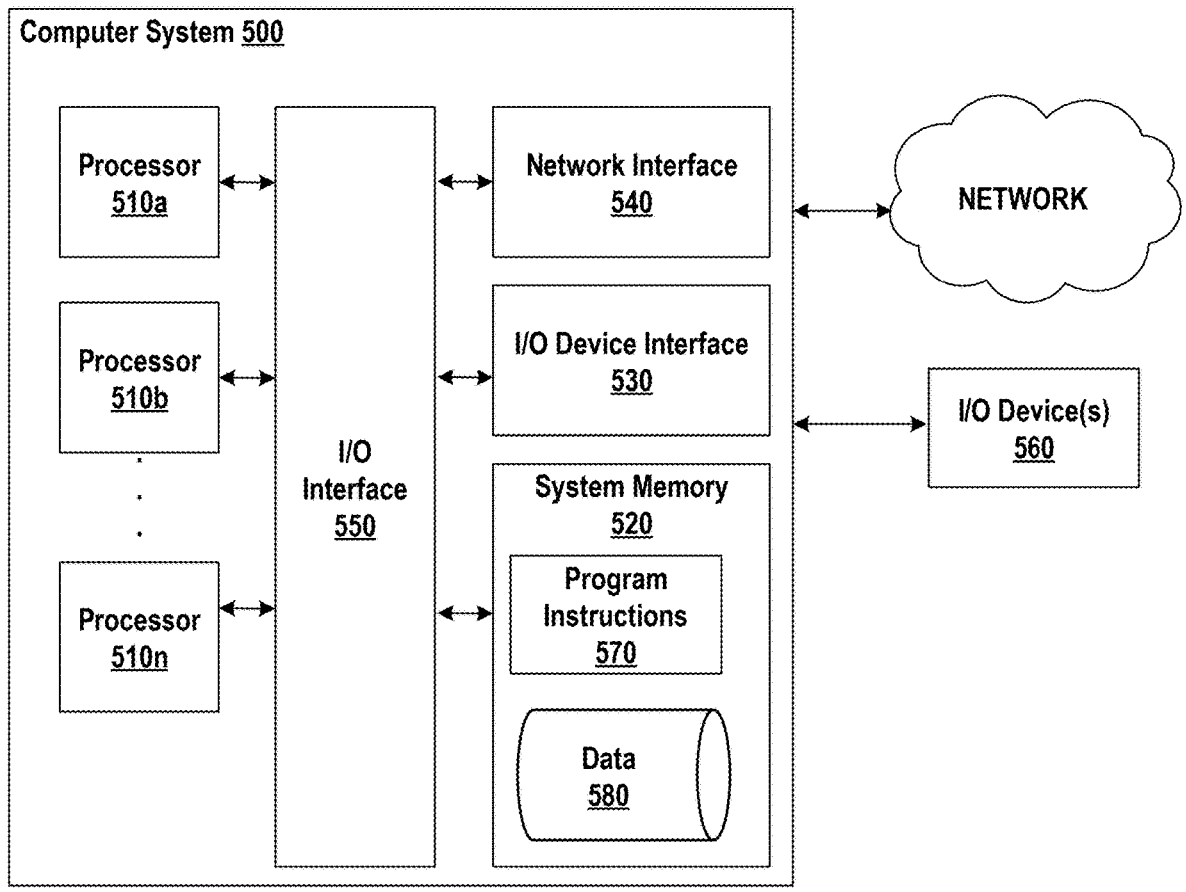
FIG. 5 illustrates a computing system that can be used for transferring resources between networks, in accordance with one or more embodiments of this disclosure.

FIG. 5 shows an example computing system that may be used in accordance with some embodiments of this disclosure. In some instances, computing system 500 is referred to as a computer system 500. A person skilled in the art would understand that those terms may be used interchangeably. The components of FIG. 5 may be used to perform some or all operations discussed in relation to FIGS. 1-4. Furthermore, various portions of the systems and methods described herein may include or be executed on one or more computer systems similar to computing system 500. Further, processes and modules described herein may be executed by one or more processing systems similar to that of computing system 500.

Computing system 500 may include one or more processors (e.g., processors 510*a*-510*n*) coupled to system memory 520, an input/output (I/O) device interface 530, and a network interface 540 via an I/O interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 500. A processor may execute code (e.g., processor firmware, a protocol stack, a database management system, an operating system, or a combination thereof) that creates an execution environment for program instructions.

A processor may include a programmable processor. A processor may include general or special purpose microprocessors. A processor may receive instructions and data from a memory (e.g., system memory 520). Computing system 500 may be a uni-processor system including one processor (e.g., one or more processors 510*a*), or a multiprocessor system including any number of suitable processors (e.g., 510*a*-510*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on remote computer systems, for example, may be connected to computer system 500 via a network and/or network interface 540.

The I/O device interface 530 and I/O devices 560 may be used to enable manipulation of the three-dimensional model as well. For example, the user may be able to use I/O devices such as a keyboard and touchpad to indicate specific selections for nodes, adjust values for nodes, select from the history of machine learning models, select specific inputs or outputs, and/or the like. Alternatively or additionally, the user may use their voice to indicate specific nodes, specific models, and/or the like via the voice recognition device and/or microphones.

Network interface 540 may include a network adapter that provides for connection of computer system 500 to a network. Network interface 540 may facilitate data exchange between computer system 500 and other devices connected to the network. Network interface 540 may support wired or wireless communication. The network may include an electronic communication network, such as the internet, a LAN, a WAN, a cellular communications network, or the like.

System memory 520 may be configured to store program instructions 570 or data 580. Program instructions 570 may be executable by a processor (e.g., one or more of processors 510a-510n) to implement one or more embodiments of the present techniques. Program instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. A non-transitory, computer-readable storage medium may include non-volatile memory (e.g., flash memory, ROM, PROM, EPROM, EEPROM), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 520 may include a non-transitory, computer-readable storage medium that may have program instructions stored thereon that are executable by a computer processor (e.g., one or more of processors 510a-510n) to cause the subject matter and the functional operations described herein. A memory (e.g., system memory 520) may include a single memory device and/or a plurality of memory devices (e.g., distributed memory devices).

I/O interface 550 may be configured to coordinate I/O traffic between processors 510a-510n, system memory 520, network interface 540, I/O devices 560, and/or other peripheral devices. I/O interface 550 may perform protocol, timing, or other data transformations to convert data signals from one component (e.g., system memory 520) into a format suitable for use by another component (e.g., processors 510a-510n). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 500 or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 500 may also be connected to other devices that are not illustrated or may operate as a stand-alone system. In addition, the functionality provided by the illustrated components may, in some embodiments, be combined in fewer components, or be distributed in additional components. Similarly, in some embodiments, the functionality of some of the illustrated components may not be provided, or other additional functionality may be available.

Figure 6:
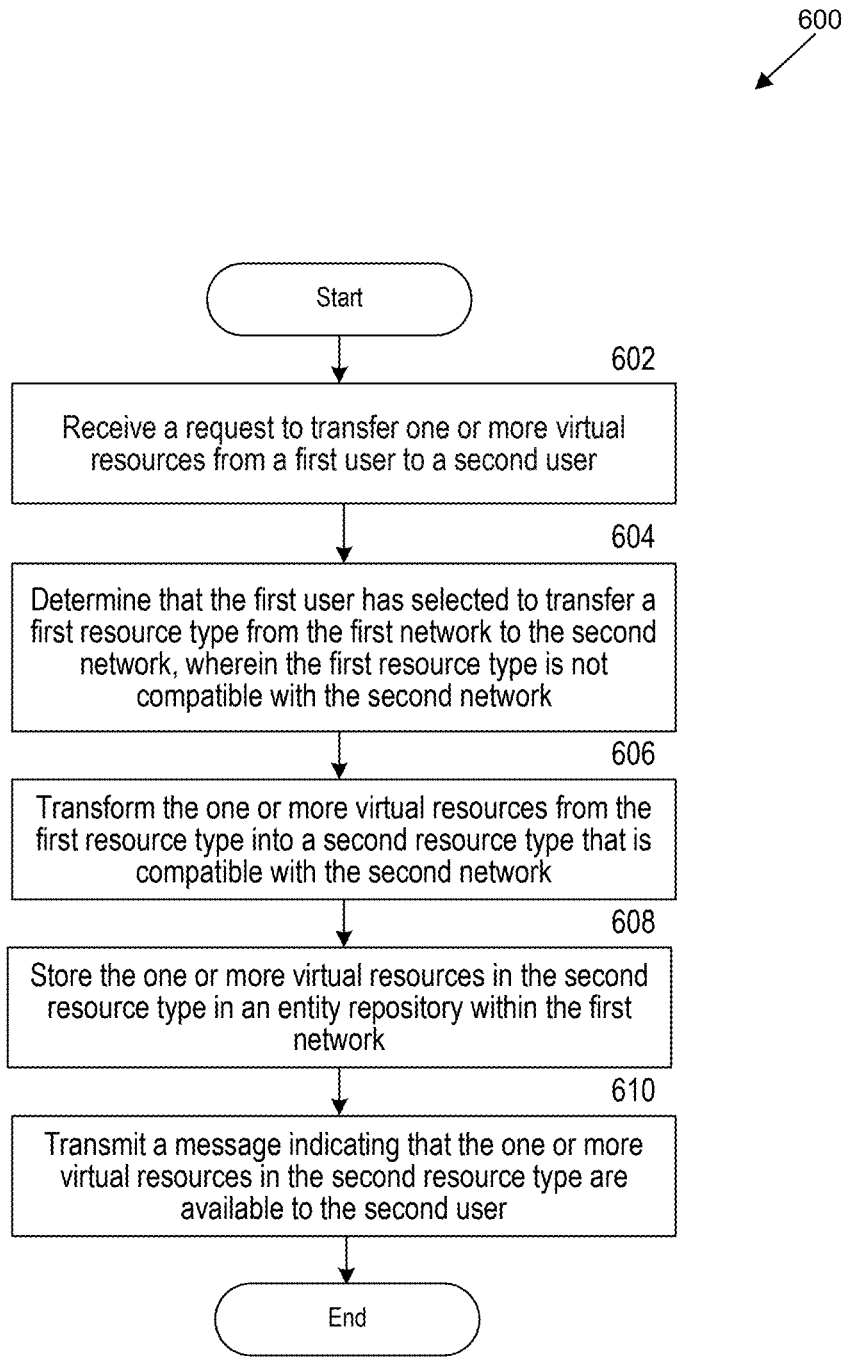
FIG. 6 is a flowchart of operations for transferring resources between networks, in accordance with one or more embodiments of this disclosure.

FIG. 6 is a flowchart 600 of operations for transferring resources between networks, in accordance with one or more embodiments of this disclosure. The operations of FIG. 6 may use components described in relation to FIG. 5. In some embodiments, virtual resource migration system 160 may include one or more components of computer system 500.

At operation 602, one or more of processors 510a-510n receive a request to transfer one or more virtual resources from a first user to a second user, wherein the first user uses a first network and the second user uses a second network. For example, virtual resource migration system 160 may use one or more processors 510a, 510b, and/or 510n to perform the receiving. The processor(s) may receive the request through a first user device. One or more of processors 510a-510n may receive the data over communication network 140 using network interface 540.

At operation 604, one or more of processors 510a-510n determine that the first user has selected to transfer a first resource type from the first network to the second network, wherein the first resource type is not compatible with the second network. In some examples, incompatibility between resource types may include different formats of resources or different types of resources that are used by the different networks. For example, the first network may use a points system that may be incompatible with a virtual token at the second network, or the second network may use a representation of cash.

At operation 606, one or more of processors 510a-510n transform the one or more virtual resources from the first resource type into a second resource type that is compatible with the second network. For example, the one or more of processors 510a-510n may be used to transform the one or more virtual resources from the first resource type into a second resource type that is compatible with the second network.

For example, the transform may be performed by retrieving one or more transform parameters associated with both the first resource type and the second resource type and storing, within a transfer repository, the one or more transform parameters in combination with the identifier corresponding to the request. The virtual resources management subsystem 164 may transform the one or more virtual resources using the one or more transform parameters. As described herein, in the example where the first resource type is points and the second resource type is a digital representation of currency or cash, the transform parameters may include an exchange rate.

At operation 608, one or more of processors 510a-510n may be used to store the one or more virtual resources in the second resource type in an entity repository within the first network. For example, the one or more of processors 510a-510n may store the one or more virtual resources in the second resource type in an entity repository within the first network with an identifier corresponding to the request on the first network (e.g., such as identifier "request_ID" of FIG. 3B). For example, virtual resource migration system 160 may use one or more processors 510a-510n to perform the earlier operations and may store the results in system memory 520.

At operation 610, one or more of processors 510a-510n transmit a message onto the second network indicating that the one or more virtual resources in the second resource type are to be transferred to the second user. According to some examples, after transmitting the message, the system may receive, from the second network, a notification indicating that the second user has rejected the one or more virtual resources. Based on receiving the notification, the system may retrieve an entry associated with the one or more virtual resources from the entity repository and remove the entry from the entity repository. The system may transform, using the one or more transform parameters, the one or more virtual resources from the second resource type into the first resource type and add, e.g., to the first user repository, the one or more virtual resources transformed into the first resource type.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for transferring resources between networks, the method comprising: receiving, from a user device, a request to transfer one or more virtual resources from a first user for use in providing one or more associated virtual resources to a second user, wherein the first user uses a first network and the second user uses a second network; determining that the first user has selected to transfer a first resource type of a plurality of resource types from the first network for the use in providing the one or more associated virtual resources to the second network, wherein the first resource type is not compatible with the second network; removing the one or more virtual resources from a first user repository within the first network, wherein the first user repository stores virtual resources of the first resource type; transforming the one or more virtual resources from the first resource type into the one or more associated virtual resources, the one or more associated virtual resources being of a second resource type that is compatible with the second network; storing the one or more associated virtual resources in of the second resource type in an entity repository within the first network, wherein the one or more virtual resources are stored with an identifier corresponding to the request on the first network; and transmitting a message onto the second network indicating that the one or more associated virtual resources in of the second resource type are to be moved from the entity repository to a second user repository corresponding to the second user within the second network.

2. The method of the preceding embodiment, wherein the instructions for transforming the one or more virtual resources from the first resource type into one or more associated virtual resources of the second resource type further comprise: retrieving one or more transform parameters associated with both the first resource type and the second resource type; storing, within a transfer repository, the one or more transform parameters in combination with the identifier corresponding to the request; and transforming the one or more virtual resources using the one or more transform parameters.

3. The method of any of the preceding embodiments, further comprising: receiving, from the second network, a notification indicating that the second user has rejected the one or more associated virtual resources; based on receiving the notification, retrieving, from the entity repository, an entry associated with the one or more associated virtual resources; removing the entry from the entity repository; transforming, using the one or more transform parameters, the one or more associated virtual resources from the second resource type into the one or more virtual resources of the first resource type; and adding, to the first user repository, the one or more virtual resources of the first resource type.

4. A method for transferring resources between networks, the method comprising: receiving, from a user device, a request to transfer one or more virtual resources from a first user to a second user, wherein the first user uses a first network and the second user uses a second network; determining that the first user has selected to transfer a first resource type of a plurality of resource types from the first network to the second network, wherein the first resource type is not compatible with the second network; transforming the one or more virtual resources from the first resource type into a second resource type that is compatible with the second network; storing the one or more virtual resources in the second resource type in an entity repository within the first network; and transmitting a message onto the second network indicating that the one or more virtual resources in the second resource type are available to the second user.

5. A method for transferring resources between networks, the method comprising: receiving a request to transfer one or more virtual resources from a first user to a second user, wherein the first user uses a first network and the second user uses a second network; determining that the one or more virtual resources are of a first resource type of a plurality of resource types, wherein the first resource type is not compatible with the second network; transforming the one or more virtual resources from the first resource type into a second resource type that is compatible with the second network; storing the one or more virtual resources in the second resource type in an entity repository within the first network; and transmitting a message onto the second network indicating request completion.

6. The method of the preceding embodiment, wherein the instructions for transforming the one or more virtual resources from the first resource type into the second resource type further cause the one or more processors to perform operations comprising: retrieving one or more transform parameters associated with both the first resource type and the second resource type; storing, within a transfer repository, the one or more transform parameters in combination with an identifier corresponding to the request; and transforming the one or more virtual resources using the one or more transform parameters.

7. The method of any of the preceding embodiments, further comprising: receiving, from the second network, a notification indicating that the second user has rejected the one or more virtual resources; based on receiving the notification, retrieving, from the entity repository, an entry associated with the one or more virtual resources; removing the entry from the entity repository; transforming, using the one or more transform parameters, the one or more virtual resources from the second resource type into the first resource type; and adding, to a first user repository associated with the first user, the one or more virtual resources transformed into the first resource type.

8. The method of any of the preceding embodiments, further comprising: determining whether the first user is associated with a network account on the second network; based on determining that the first user is not associated with the network account on the second network, generating, based on user account data on the first network, a user tag representing the first user, wherein the user tag comprises a user identifier associated with the first user; setting a non-discoverable parameter for the user tag to generate a hidden user tag, wherein the hidden user tag disables transfer of the virtual resources to the first user on the first network; and transmitting the hidden user tag from the first network to the second network, wherein a computing device on the second network receives the hidden user tag and generates the network account on the second network for the first user, and wherein the network account is enabled to transmit the virtual resources and is not enabled to receive the virtual resources.

9. The method of any of the preceding embodiments, wherein generating the user tag comprises: retrieving, from a user account on the first network, user parameters associated with the first user, wherein the user parameters comprise a resource type associated with the first user on the first network; and generating the user tag using the user parameters and an entity identifier associated with an entity corresponding to the entity repository.

10. The method of any of the preceding embodiments, further comprising: retrieving a user account data associated with the first user on the first network; generating a user tag for the first user; and transmitting a search request to the second network for an indication of whether the first user is associated with a network account on the second network, wherein the search request comprises the user tag.

11. The method of any of the preceding embodiments, further comprising: removing the one or more virtual resources from a first user repository within the first network, wherein the first user repository stores virtual resources of the first resource type.

12. A method for transferring resources between networks, the method comprising: receiving a request to convey one or more virtual resources from a first user as one or more associated virtual resources to a second user, wherein the first user uses a first network and the second user uses a second network; determining that the one or more virtual resources are of a first resource type of a plurality of resource types, wherein the first resource type is not compatible with the second network; transforming the one or more virtual resources of the first resource type into the one or more associated virtual resources, the one or more associated virtual resources being of a second resource type that is compatible with the second network; storing the one or more associated virtual resources of the second resource type in an entity repository; and transmitting a message indicating request completion.

13. The method of the preceding embodiment, wherein transforming one or more virtual resources of the first resource type into the one or more associated virtual resources of a second type further cause the one or more processors to perform operations comprising: retrieving one or more transform parameters associated with both the first resource type and the second resource type; storing, within a transfer repository, the one or more transform parameters in combination with an identifier corresponding to the request; and transforming the one or more virtual resources using the one or more transform parameters.

14. The method of any of the preceding embodiments, wherein the method further comprises: receiving, from the second network, a notification indicating that the second user has rejected the one or more associated virtual resources; based on receiving the notification, retrieving, from the entity repository, an entry associated with the one or more associated virtual resources; removing the entry from the entity repository; transforming, using the one or more transform parameters, the one or more associated virtual resources of the second resource type into one or more virtual resources of the first resource type; and adding, to a first user repository associated with the first user, the one or more virtual resources of the first resource type.

15. The method of any of the preceding embodiments, wherein the method further comprises: determining whether the first user is associated with a network account on the second network; based on determining that the first user is not associated with the network account on the second network, generating, based on user account data on the first network, a user tag representing the first user, wherein the user tag comprises a user identifier associated with the first user; setting a non-discoverable parameter for the user tag to generate a hidden user tag, wherein the hidden user tag disables transfer of the one or more virtual resources to the first user on the first network; and transmitting the hidden user tag from the first network to the second network, wherein a computing device on the second network receives the hidden user tag and generates the network account on the second network for the first user, and wherein the network account is enabled to transmit the one or more associated virtual resources and is not enabled to receive the one or more virtual resources.

16. The method of any of the preceding embodiments, wherein the method further comprises generating the user tag further cause the one or more processors to perform operations comprising: retrieving, from a user account on the first network, user parameters associated with the first user, wherein the user parameters comprise a resource type associated with the first user on the first network; and generating the user tag using the user parameters and an entity identifier associated with an entity corresponding to the entity repository.

17. The method of any of the preceding embodiments, wherein the method further comprises: retrieving user account data associated with the first user on the first network; generating a user tag for the first user; and transmitting a search request to the second network for an indication of whether the first user is associated with a network account on the second network, wherein the search request comprises the user tag.

18. The method of any of the preceding embodiments, wherein the method further comprises: removing the one or more virtual resources from a first user repository within the first network, wherein the first user repository stores virtual resources of the first resource type.

19. One or more tangible, non-transitory, computer-readable media storing instructions that, when executed by a data processing apparatus, cause the data processing apparatus to perform operations comprising those of any of embodiments 1-18.

20. A system comprising: one or more processors; and memory storing instructions that, when executed by the one or more processors, cause the processors to effectuate operations comprising those of any of embodiments 1-18.

21. A system comprising means for performing any of embodiments 1-18.

13. A system comprising cloud-based circuitry for performing any of embodiments 1-18.

We claim:

1. A system for transferring resources between networks, the system comprising:
   one or more processors; and
   one or more memories configured to store instructions that when executed by the one or more processors perform operations comprising:
      receiving, from a user device, a request to transfer one or more virtual resources from a first user for use in providing one or more associated virtual resources to a second user, wherein the first user uses a first network and the second user uses a second network;
      determining that the first user has selected to transfer a first resource type of a plurality of resource types from the first network for the use in providing the one or more associated virtual resources to the second network, wherein the first resource type is not compatible with the second network;
      removing the one or more virtual resources from a first user repository within the first network, wherein the first user repository stores virtual resources of the first resource type;
      transforming the one or more virtual resources from the first resource type into the one or more associated virtual resources, the one or more associated virtual resources being of a second resource type that is compatible with the second network;
      storing the one or more associated virtual resources of the second resource type in an entity repository within the first network, wherein the one or more associated virtual resources are stored with an identifier corresponding to the request on the first network;
   transmitting a message indicating that the one or more associated virtual resources of the second resource type are available to the second user;
   determining whether the first user is associated with a network account on the second network;
   based on determining that the first user is not associated with the network account on the second network, generating, based on user account data on the first network, a user tag representing the first user, wherein the user tag comprises a user identifier associated with the first user;
   setting a non-discoverable parameter for the user tag to generate a hidden user tag, wherein the hidden user tag disables transfer of the virtual resources to the first user on the first network; and
   transmitting the hidden user tag from the first network to the second network, wherein a computing device on the second network receives the hidden user tag and generates the network account on the second network for the first user, and wherein the network account is enabled to transmit the virtual resources and is not enabled to receive the virtual resources.

2. The system of claim 1, wherein the instructions for transforming the one or more virtual resources from the first resource type into the one or more associated virtual resources of the second resource type further cause the one or more processors to perform operations comprising:
   retrieving one or more transform parameters associated with both the first resource type and the second resource type;

storing, within a transfer repository, the one or more transform parameters in combination with the identifier corresponding to the request; and transforming the one or more virtual resources using the one or more transform parameters.

3. The system of claim 2, wherein the instructions further cause the one or more processors to perform operations comprising:

receiving, from the second network, a notification indicating that the second user has rejected the one or more associated virtual resources;

based on receiving the notification, retrieving, from the entity repository, an entry associated with the one or more associated virtual resources;

removing the entry from the entity repository;

transforming, using the one or more transform parameters, the one or more associated virtual resources from the second resource type into the one or more virtual resources of the first resource type; and adding, to the first user repository, the one or more virtual resources of the first resource type.

4. The system of claim 1, wherein the instructions for generating the user tag further cause the one or more processors to perform operations comprising:

retrieving, from a user account on the first network, user parameters associated with the first user, wherein the user parameters comprise a resource type associated with the first user on the first network; and generating the user tag using the user parameters and an entity identifier associated with an entity corresponding to the entity repository.

5. The system of claim 1, wherein the instructions further cause the one or more processors to perform operations comprising:

retrieving a user account data associated with the first user on the first network;

generating a user tag for the first user; and transmitting a search request to the second network for an indication of whether the first user is associated with a network account on the second network, wherein the search request comprises the user tag.

6. A method for transferring resources between networks, the method comprising:

receiving, from a user device, a request to transfer one or more virtual resources from a first user to a second user, wherein the first user uses a first network and the second user uses a second network;

determining that the first user has selected to transfer a first resource type of a plurality of resource types from the first network to the second network, wherein the first resource type is not compatible with the second network;

transforming the one or more virtual resources from the first resource type into a second resource type that is compatible with the second network;

storing the one or more virtual resources of the second resource type in an entity repository within the first network;

transmitting a message indicating that the one or more virtual resources of the second resource type are available to the second user;

determining whether the first user is associated with a network account on the second network;

based on determining that the first user is not associated with the network account on the second network, generating, based on user account data on the first network, a user tag representing the first user, wherein the user tag comprises a user identifier associated with the first user;

setting a non-discoverable parameter for the user tag to generate a hidden user tag, wherein the hidden user tag disables transfer of the virtual resources to the first user on the first network; and transmitting the hidden user tag from the first network to the second network, wherein a computing device on the second network receives the hidden user tag and generates the network account on the second network for the first user, and wherein the network account is enabled to transmit the virtual resources and is not enabled to receive the virtual resources.

7. The method of claim 6, wherein transforming the one or more virtual resources from the first resource type into the second resource type further comprises:

retrieving one or more transform parameters associated with both the first resource type and the second resource type;

storing, within a transfer repository, the one or more transform parameters in combination with an identifier corresponding to the request; and transforming the one or more virtual resources from the first resource type using the one or more transform parameters.

8. The method of claim 7, further comprising:

receiving, from the second network, a notification indicating that the second user has rejected the one or more virtual resources;

based on receiving the notification, retrieving, from the entity repository, an entry associated with the one or more virtual resources;

removing the entry from the entity repository;

transforming, using the one or more transform parameters, the one or more virtual resources from the second resource type into the first resource type; and adding, to a first user repository associated with the first user, the one or more virtual resources transformed into the first resource type.

9. The method of claim 6, wherein generating the user tag further comprises:

retrieving, from a user account on the first network, user parameters associated with the first user, wherein the user parameters comprise a resource type associated with the first user on the first network; and generating the user tag using the user parameters and an entity identifier associated with an entity corresponding to the entity repository.

10. The method of claim 6, further comprising:

retrieving user account data associated with the first user on the first network;

generating a user tag for the first user; and transmitting a search request to the second network for an indication of whether the first user is associated with a network account on the second network, wherein the search request comprises the user tag.

11. The method of claim 6, further comprising removing the one or more virtual resources from a first user repository within the first network, wherein the first user repository stores virtual resources of the first resource type.

12. One or more non-transitory computer-readable media storing instructions thereon, where the instructions when executed by one or more processors cause the one or more processors to perform operations comprising:

receiving a request to convey one or more virtual resources from a first user as one or more associated virtual resources to a second user, wherein the first user uses a first network and the second user uses a second network;

determining that the one or more virtual resources are of a first resource type of a plurality of resource types, wherein the first resource type is not compatible with the second network;

transforming the one or more virtual resources of the first resource type into the one or more associated virtual resources, the one or more associated virtual resources being of a second resource type that is compatible with the second network;

storing the one or more associated virtual resources of the second resource type in an entity repository;

transmitting a message indicating that the one or more associated virtual resources of the second resource type are available to the second user;

determining whether the first user is associated with a network account on the second network;

based on determining that the first user is not associated with the network account on the second network, generating, based on user account data on the first network, a user tag representing the first user, wherein the user tag comprises a user identifier associated with the first user;

setting a non-discoverable parameter for the user tag to generate a hidden user tag, wherein the hidden user tag disables transfer of the virtual resources to the first user on the first network; and transmitting the hidden user tag from the first network to the second network, wherein a computing device on the second network receives the hidden user tag and generates the network account on the second network for the first user, and wherein the network account is enabled to transmit the virtual resources and is not enabled to receive the virtual resources.

13. The one or more non-transitory computer-readable media of claim 12, wherein the instructions for transforming the one or more virtual resources of the first resource type into the one or more associated virtual resources of a second type further cause the one or more processors to perform operations comprising:

retrieving one or more transform parameters associated with both the first resource type and the second resource type;

storing, within a transfer repository, the one or more transform parameters in combination with an identifier corresponding to the request; and transforming the one or more virtual resources using the one or more transform parameters.

14. The one or more non-transitory computer-readable media of claim 13, wherein the instructions further cause the one or more processors to perform operations comprising:

receiving, from the second network, a notification indicating that the second user has rejected the one or more associated virtual resources;

based on receiving the notification, retrieving, from the entity repository, an entry associated with the one or more associated virtual resources;

removing the entry from the entity repository;

transforming, using the one or more transform parameters, the one or more associated virtual resources of the second resource type into one or more virtual resources of the first resource type; and adding, to a first user repository associated with the first user, the one or more virtual resources of the first resource type.

15. The one or more non-transitory computer-readable media of claim 12, wherein the instructions for generating the user tag further cause the one or more processors to perform operations comprising:

retrieving, from a user account on the first network, user parameters associated with the first user, wherein the user parameters comprise a resource type associated with the first user on the first network; and generating the user tag using the user parameters and an entity identifier associated with an entity corresponding to the entity repository.

16. The one or more non-transitory computer-readable media of claim 12, wherein the instructions further cause the one or more processors to perform operations comprising:

retrieving user account data associated with the first user on the first network;

generating a user tag for the first user; and transmitting a search request to the second network for an indication of whether the first user is associated with a network account on the second network, wherein the search request comprises the user tag.

17. The one or more non-transitory computer-readable media of claim 12, wherein the instructions further cause the one or more processors to remove the one or more virtual resources from a first user repository within the first network, wherein the first user repository stores virtual resources of the first resource type.

* * * * *